Figure 3:
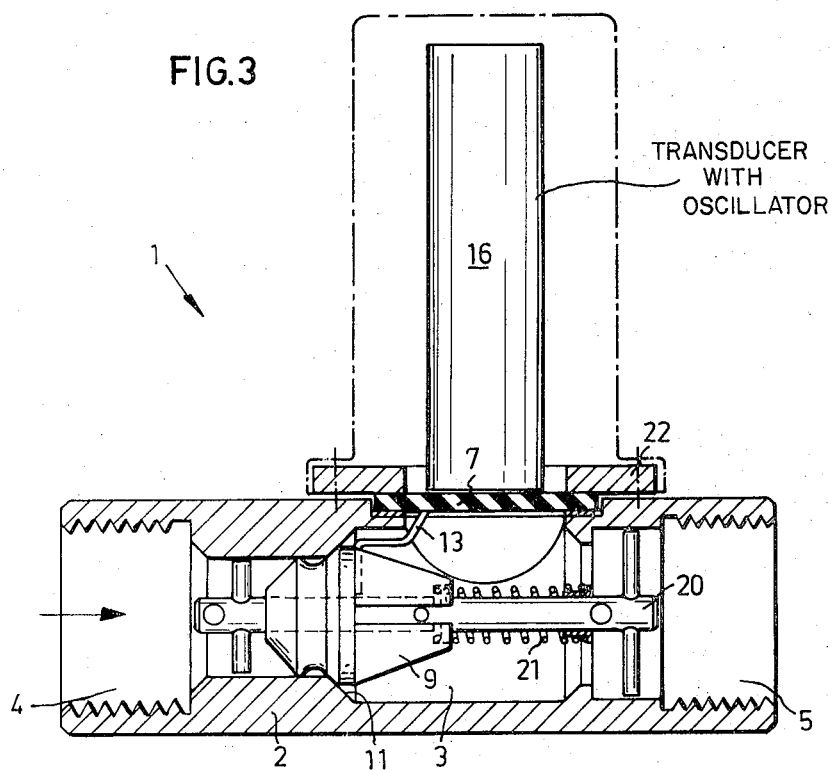

United States Patent [19]
Thorbard et al.

[11] 3,846,774
[45] Nov. 5, 1974

[54] FLOW AND DIFFERENTIAL PRESSURE MONITOR

[75] Inventors: Hugo Adiel Thorbard, Huddinge; Bjorn Anders Thorbard, Hagersten, both of Sweden

[73] Assignee: Elektriske AB Eletta, Huddinge, Sweden

[22] Filed: Feb. 6, 1973

[21] Appl. No.: 330,036

[30] Foreign Application Priority Data
Feb. 11, 1972 Sweden .............................. 1662/72

[52] U.S. Cl. .............. 340/239 R, 137/554, 340/238
[51] Int. Cl. .......................................... G08b 21/00
[58] Field of Search ........ 340/239, 238; 324/61 QS; 137/554

[56] References Cited
UNITED STATES PATENTS
1,967,017  7/1934  Bohner............................ 340/239 R Primary Examiner—John W. Caldwell
Assistant Examiner—Daniel Myer
Attorney, Agent, or Firm—Young & Thompson

[57] ABSTRACT

A flow and pressure differential monitor for detecting changes in fluid flow and for producing an alarm signal in response to flow changes above or below a set point level. The monitor includes a fluid flow channel and a signal generating means coacting therewith. The signal generating means comprises a movable element provided with a metal portion and arranged in the channel such as to be adjustable by fluid flowing therethrough. An inductive transducer is arranged externally of the channel such as to be actuated by the metal portion when the movable element occupies a certain position, actuation of the transducer causing an alarm signal to be given.

13 Claims, 6 Drawing Figures

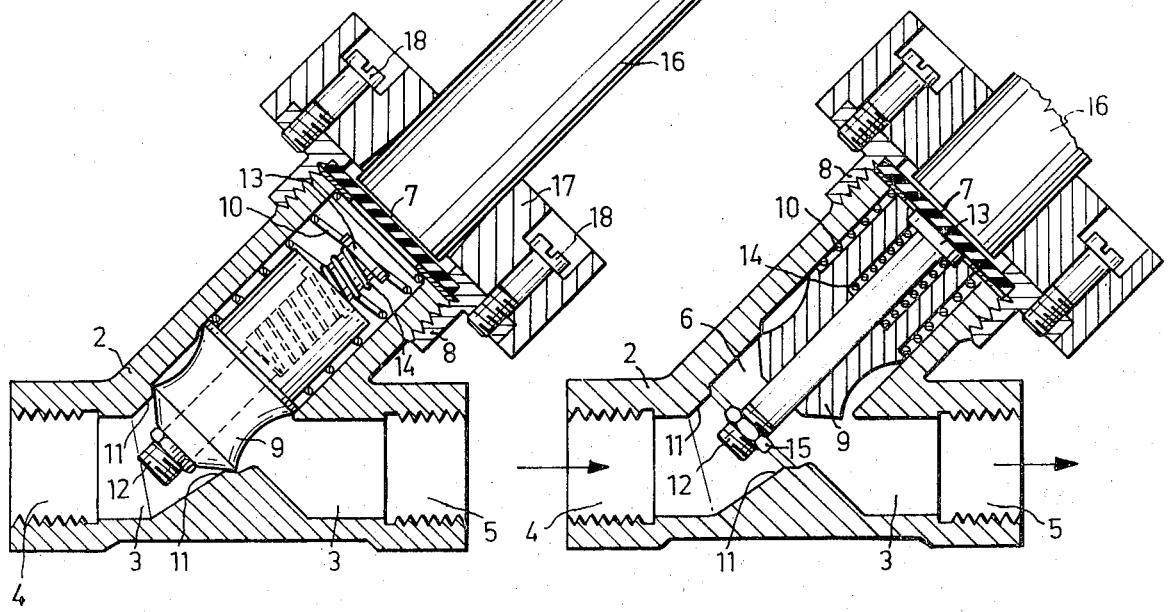

TRANSDUCER WITH OSCILLATOR

FLOW AND DIFFERENTIAL PRESSURE MONITOR

The present invention relates to a flow and differential pressure monitor for indicating fluid flow, including a fluid flow channel and a signal generating indicating means.

With the majority of conventional flow and differential pressure monitors an element movably disposed in a channel is arranged to transmit movement caused by the flow of a fluid through the channel to a signal means located externally of the channel via a lead-through disposed in one of the defining walls thereof. This type of monitor has many disadvantages. For example, since the aforementioned movement is transmitted mechanically, friction arises and therewith a reduced response to small changes in fluid flow. It is also difficult to obtain satisfactory seals which are capable of withstanding high pressures, resistant to wear and which present but a small degree of friction to the lead-through means. The manufacture and maintenance of such known devices are made complicated and expensive by the fact that the movable elements are normally easily damaged and must ge given a special design.

Other types of flow and differential pressure monitors operate with magnetic transfer techniques, i.e. a magnet actuated by the fluid flow is arranged to actuate in turn a relay or the like located externally of the fluid flow passage. Among the disadvantages presented by devices of this latter type is that the magnet attracts magnetic particles which are liable to unfavourably affect the operation of the device.

The object of the present invention is to eliminate the aforementioned disadvantages and to provide a flow and differential pressure monitor which is highly responsive and reliable and which is of simple construction and thereby inexpensive to manufacture and maintain.

This object is achieved according to the invention by the fact that the signal generating indicating means embodies a movable element arranged within the fluid flow channel and provided with a metal portion and capable of being adjusted to different positions by the fluid flow, and externally of the fluid flow channel a signal generator, hereinafter referred to as the signal transducer in which an oscillator is arranged to be actuated by the metal portion at a certain position of the movable element to switch from one state to another, preferably from an oscillating to a non-oscillating state, or vice versa, and to produce a signal in response to actuation by said metal portion, said switching from one state to another being caused by generation of eddy currents in said metal portion, and by the fact that the portion of the defining wall of the fluid flow channel located between the movable element and the inductive transducer comprises an electric insulating material.

A flow and differential pressure monitor of this construction obviates the need of packing boxes and other types of seals in the channel walls, which among other things readily enables it to be subjected to high pressure without detriment. The absence of mechanical transmission increases the response (sensitivity) and accuracy of the device, while the position of the inductive transducer externally of the channel provides a safer flow monitor from the point of view of the wellbeing of personnel etc. (risk of explosion etc.). With a monitor constructed in accordance with the invention, it is also a simple matter to dismantle or exchange the inductive transducer without interfering with the fluid channel system in other respects.

The inductive transducer used in the monitor of the present invention should be a contactless switch provided with an oscillator, optionally in cooperation with a thyristor. Such a transducer is actuated by an electrically conductive, suitably metallic body (the metal portion) in a manner such that the oscillating circuit of the oscillator ceases to oscillate when the metal portion comes in the vicinity of the oscillating circuit coil or, if provided, its core. When the oscillator ceases to oscillate, the output of the transducer becomes conductive for example so as to act as a contact which is closed when the metal portion reaches the vicinity of the oscillating circuit and loads the same.

The use of such oscillator inductive transducers with the fluid and differential pressure monitor of the present invention provides considerable advantages, all of which cannot immediately be perceived. A fully capsulated, water-tight transducer of the aforementioned construction is inexpensive, small in size and capable of being connected directly to an AC consumer network or to another network or to a battery of for example 40 volts. No operating force is required and yet the output circuit withstands relatively high loads and can switch a relatively high power of ten, twenty or even hundreds of watts even with a small transducer. The power consumption and therewith the quantity of heat generated is very small and being of the order of some tenths of a watt. The transducer can be adjusted so as to operate reliably even at relatively large distances of ten millimeters or more between the metal body and the transducer, the mechanical coupling hysteresis being small (always less than one millimeter) and only very slight movement of the metal portion, some tenths of a millimeter, being needed to operate the transducer. The transducer is gas and water-tight and is highly proof against pressure, vibrations and impacts. Above all, the transducer can be activated by means of the metal portion through an insulating material many millimeters thick, and even a few centimeters thick, thereby enabling a reliable, pressure-tight partition wall to be used between the transducer and the metal body, and hence the metal portion can be located in a liquid or gas under high pressure (even exceeding some $10^7$ N/m$^2$) while the transducer is located in the ambient air. The metal body may be made from a non-corrosive material and may be constructed to prevent particles or impurities from being collected thereon by magnetic or other forces, for example by making the body from a plate of bright stainless steel, optionally provided with rounded edges.

Thus, the use of such a transducer enables the object of the invention to be constructed for extreme values in a manner more simple, less expensive and more reliable than hitherto possible. The monitor can be readily constructed without special measures being taken for gas or liquid pressures of $6\times10^6 - 8\times10^6$ N/m$^2$ and to produce a signal when the pressure difference is of the order of 5000 N/m$^2$ or less.

With one advantageous embodiment of the invention the metal portion and the inductive transducer may be given a construction whereby they can be adjusted to different predetermined positions in relation to each other, whereby the inductive transducer is able to produce signals at a desired, adjustable value of the flow in the channel. In this way the same flow and differential pressure monitor can be used for different flow levels, and by arranging the inductive transducer for longitudinal movement it is unnecessary to interfer with the fluid flow system when adjusting the transducer.

Another advantageous embodiment of the invention is one in which the movable element has the form of a valve body capable of being displaced by the fluid flow against a spring force. In this respect the valve body may be arranged for substantially axial movement in the channel, suitably along a guide arranged therein, or may be arranged in a branch channel connected at an angle to the fluid flow channel, the opposite end of which branch channel is defined by the aforementioned electric insulating material, the valve body being capable of movement substantially completely into the branch channel and being guided thereby. By suitable dimensioning of the valve body and spring means it is possible to obtain in a simple manner flow and differential pressure monitors which can be used in a wide number of working ranges without it being necessary to change the inductive transducer.

To permit considerable increase in flow subsequent to the signal being produced, the metal portion can be mounted on a rod arranged for longitudinal movement in the valve body and biassed by a spring towards the insulating material.

Further, the flow and differential pressure monitor can be provided with a valve seating in the fluid flow channel, against which seating the valve body is caused to abut under the action of the spring when no fluid flows in the channel. Further, the valve body can be arranged to move from the position of abutment with the valve seating in a manner such as to only negligibly change the area of an exposed through-flow area, the valve body being brought into a position during movement thereof such as to produce a signal. An arrangement of this type is particularly suitable for indicating an initial flow.

According to a further embodiment of the invention, the movable element is arranged for rotary movement with its axis of rotation located transversely of the channel.

The movable element may alternatively have the form of a metal, plastic or rubber diaphragm which, particularly if consisting of an insulating material, is bonded to a metal plate comprising the aforementioned metal portion and being made for example of stainless steel or brass.

Figure 4:
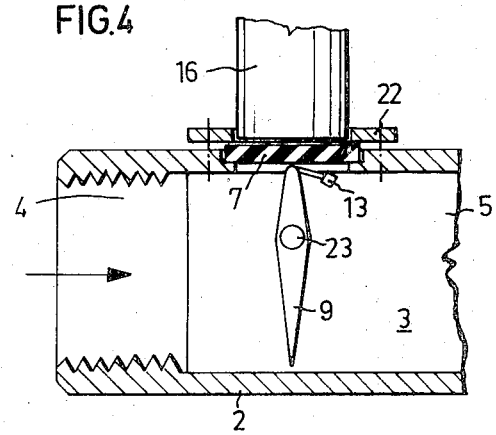
Figure 5:
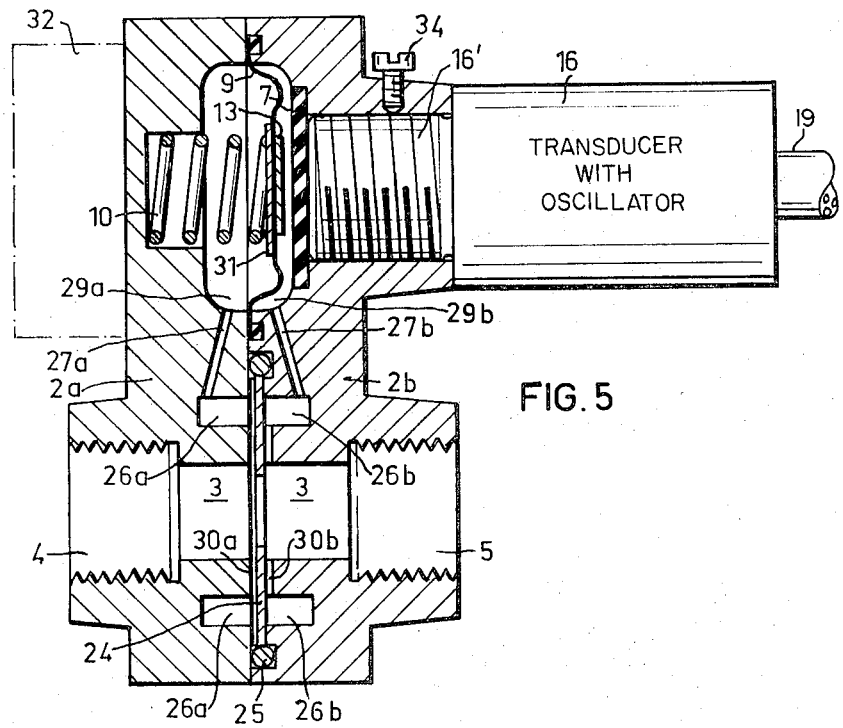
Figure 6:
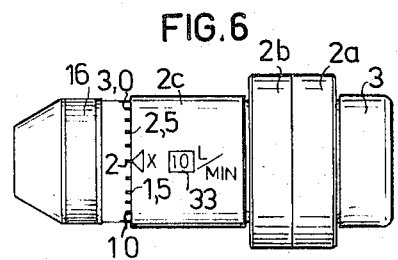

The invention will now be described in more detail with reference to embodiments thereof illustrated in the accompanying drawings, in which FIG. 1 is a sectional view through a flow monitor according to the invention, the elements of the monitor being shown in position in which no fluid flows through the channel, FIG. 2 illustrates the same flow monitor as that shown in FIG. 1 although in a different sectional view and the elements occupying a position in which fluid is flowing through the channel, FIG. 3 is a sectional view through another embodiment of the monitor, the elements being in the position in which no fluid flows through the channel, FIG. 4 is a sectional view through another embodiment of the monitor, the elements being in a position where no fluid flows through the channel, FIG. 5 is a sectional view of yet another embodiment of the monitor, this embodiment lacking a valve body, and FIG. 6 illustrates a flow monitor provided with adjustment means.

The flow and differential pressure monitor 1 illustrated in FIGS. 1 and 2 is provided with a housing 2 in which is disposed a through-flow channel 3 having a threaded inlet opening 4 and a threaded outlet opening 5 intended to be connected to a line (not shown) in which the flow is desired to be monitored. The housing 2 is provided with a branch channel 6 joining the channel 3 and the longitudinal axis of which forms an acute angle with the axis of the channel 3. The outer end of the branch channel 6 is sealingly covered by a plate 7 made of an electric insulating material, for example a glass fibre reinforced epoxy resin. The plate 7 is held securely to the housing 2 by means of a screw joint as shown at 8. Arranged in the branch channel 6 is a movable element having the form of a displaceable valve means 9 biassed by a spring 10, preferably a coil spring, towards a valve seating 11 located in the junction between the channel 3 and the branch channel 6.

The valve means 9 is provided with a stem 12 arranged for movement in the direction of displacement of the valve means, the stem 12 having arranged on the and thereof facing the plate 7 a metal portion 13. A spring 14, which is also preferably a coil spring, arranged in the valve means endeavours to move the metal portion 13 towards the plate 7 but is prevented from doing so by a stop 15 arranged in the opposite end 12.

An inductive transducer or signal generating means 16 is securely or movably connected at the screw joint 8 by means of an attachment 17 and screws 18, and is connected by a line 19 to a signal circuit, not shown.

The illustrated flow and differential pressure monitor operates in the following manner. In the starting position of the monitor, i.e. when no pressure difference prevails and hence no medium flow is present between the inlet opening 4 and the outlet opening 5, the valve means 9 is biassed by the spring 10 against the valve seating 11 to substantially close the channel 3. At the same time, the spring 14 holds the metal portion 13 away from the valve means 9 in a position such that the inductive transducer does not produce a signal. When fluid flows through the device, the valve means 9 is moved against the force exerted by the spring 10 and permits a certain, small flow of fluid in the channel 3. During movement of the valve means 9, the metal portion 13 reaches a position in which the inductive transducer 16 is actuated and produces a signal, and by suitably selecting the mutual positions of the metal portion 13 and the inductive transducer 16 the flow and differential pressure monitor can be made to produce a signal for a desired magnitude of flow. As the flow increases, the valve means 9 is forced further upwards in the branch channel 6 and finally reaches a limit position, as illustrated in FIG. 2. When the valve means 9 occupies this position the channel 3 is practically free and permits the large flow of medium to pass therethrough. In another, similar embodiment of the monitor the metal portion 13 may be stationary in relation to the valve body 9.

The valve means 9 can be caused to effect a shorter or longer displacement movement before the metal portion 13 comes into a position in which a signal is produced by changing the position of the inductive transducer 16. A graduated scale can be provided for indicating the displacement position of the transducer 16 for different, desired flow levels. The construction of the valve means 9 and the valve seating 11 may also be such as to provide for a desired degree of leakage and thereby instead use the flow and differential pressure monitor to produce a signal when an adjusted, substantial constant flow is suddenly changed for some reason. In this instant, the normal flow will not cause the valve means to move, but that movement of the valve means is caused by a change in the flow.

The branch channel 6 forms a guide for the valve means 9 which may suitably be made of reinforced Teflon or some other friction reducing and dirt repelling material. For the same purpose the walls of the branch channel 6 and the valve seating 11 may also be coated with friction reducing and dirt repelling material. The valve means 9 is fitted in the branch channel 6 so as not to seal the same. The spring constant of the spring 10 is preferably greater than that of the spring 14, although the reverse conditions are conceivable, or the springs may have the same spring constant.

The elements comprising the embodiments of FIGS. 3 and 4, which are similar to the elements in the embodiments of FIGS. 1 and 2, are identified with the same reference numerals. In the embodiment of FIG. 3 the movable element has the form of a valve means 9 arranged for axial movement on a guide 20 arranged in the channel 3 although the valve means may also be guided directly in the channel. The spring 21 arranged on the guide attempts to move the valve means upstream into abutment with the valve seating 11. The metal portion 13 attached to the valve means is intended to move along the plate 7 upon movement of the valve means, the plate 7 sealingly covering an opening in the side of the channel 3 and being held in position by a plate 22 and screws, not shown. The inductive transducer 16 is firmly secured or movably secured to the plate 22 and senses displacement of the metal portion 13 as fluid flows through the channel 3. As in the previously described embodiment, the monitor may be constructed for flows of different magnitudes and different signal levels.

FIG. 4 illustrates another conceivable embodiment of a flow and differential pressure monitor with which, instead of being displaceably arranged in the channel 3, the movable element 9 is capable of swinging around pivot 23 located transversely of the longitudinal direction of the channel. The angle through which the movable element 9 is pivoted depends on the magnitude of the flow in the channel, pivoting of the member 9 causing displacement of the metal portion 13 so that a signal is obtained at the desired flow level. The movement of the movable element can be regulated both as a result of the construction of the member itself and by means of springs (not shown) or similar devices, either separately or in combination.

The inductive transducer 16 is preferably of the oscillator type, that is to say it is provided with an oscillator whose oscillating ability or frequency is changed when a metal body is brought into its vicinity. Transducers of this type can be made to be extremely sensitive.

The aforementioned flow and differential pressure and differential monitor can be constructed for delayed off and/or on activation, thereby making it possible to prevent unnecessary alarm signals being given, for example, as the result of short duration pressure in the channel.

FIG. 5 illustrates a flow and differential pressure monitor with which the movable element 9 has the form of a diaphragm made of an elastic material such as rubber or plastics for example. The body of the illustrated monitor comprises two halves 2a and 2b which are screwed together, and has a throughpassing channel 3 presenting opposing, internally threaded openings 4, 5 for connecting pipes to the channel. A throttle plate 24 having a centrally located hole is disposed in the channel 3 clamped between the halves 2a, 2b of the body and surrounded by a sealing O-ring 25 clamped in a similar manner. The two halves 2a, 2b are provided with opposing annular passages 26a and 26b, each of which communicates with its respective chamber 29a, 29b through respective bores 27a, 27b, the two chambers being separated by means of the diaphragm 9. The two annular passageways 26a, 26b are separated by means of the throttle plate 24 and are each connected with the channel 3 on either side of the throttle plate 24 by respective recesses 30a, 30b so that the two chambers also communicate with their respective ones of the two portions of the channel 3 located on either side of the throttle plate.

The diaphragm 9 is provided on one side thereof with a plate 31 which may be made of any suitable material, while on its other side the diaphragm 9 has a metal plate 13 arranged to coact with a signal transducer 16 via an intermediate plate 7 of insulating material secured pressure-tight in the portion 2b of the body. The diameter of the plate 31 is sufficient to enable the plate to support the diaphragm against the left wall of the chamber 29a when the diaphragm is urged against this wall. Arranged in the body half 2a coaxially with the transducer 16 the plate 7 and the diaphragm 9 with its adhering plates 13, 31 is a circular blind bore having a pressure spring 10 disposed therein between the bottom of the bore and the diaphragm plate 31. The spring is relatively weak, especially if the pressure difference to be monitored by the device is small, and biasses the diaphragm towards the plate 7, although only so that the position in which the opposing elastic forces of the spring and the diaphragm are equal, is unambiguously determined, and hence the distance between the metal portion 13 and the insulating plate 7 at equal pressure in the two chambers 29a, 29b is also accurately and unambiguously determined.

When a pressure difference prevails between the liquid or gas to the left and to the right of the throttle flange, a corresponding pressure difference prevails between the chambers 29a, 29b and actuates the diaphragm. Such a pressure difference occurs if fluid flows in the channel 3. Alternatively, the throttle plate 24 may be replaced with an imperforate sealing plate and the two openings 4, 5 can be connected by conduits or the like to separate points in any object for which it is desired to monitor possibly occurring pressure differences between two points.

The housing of the transducer 16 is assumed to be provided with an externally threaded portion 16' capable of being screwed into a corresponding internally threaded opening in the body half 2b. The free end of the portion 16' is the end with which the metal portion 13 coacts inductively (as a result of eddy currents occurring in the metal portion) without being impeded by the intermediate insulating sealing plate 7. With the illustrated embodiment of FIG. 5, the transducer 16 is screwed into the body half 2b to an extent such that the free end of the portion 16' engages the plate 7. The distance between the metal portion 13 and the free end of the transducer 16 can be changed, however, by unscrewing the transducer to lesser or greater extents, whereafter it can be locked in the desired position, for example by means of a grub screw 34 or by some other known locking device. By changing the aforementioned distance, it is possible to change the differential pressure at which the transducer produces a signal indicating that the monitored differential pressure has increased (or decreased) to the limit value at which an alarm shall be given.

The aforementioned limit value may, in addition or alternatively, be adjusted by changing the aforementioned distance in another way and/or by changing the force of the spring 10, for example by means of a spring tensioning screw.

The portion of the monitor shown in chain lines 32 in FIG. 5 will be described with reference to FIG. 6.

FIG. 6 illustrates a flow and differential pressure monitor seen from the outside, the transducer 16 being partially or fully rotatable and optionally longitudinally displaceable by rotation for the purpose of adjusting the monitor to differential pressures at which the transducer produces an alarm signal. The monitor may be constructed approximately similar to that illustrated in FIG. 5, FIG. 6 illustrating the monitor in top plan view although turned sideways according to FIG. 5. The embodiment illustrated in FIG. 6, however, need not be fully identical with that illustrated in FIG. 5.

To the body half 2a is secured a detachable casing 32 containing a batch of different throttle plates 24 which may be mounted on and secured by means of a screw attached to the body and provided with an outer nut or threaded in the body and provided with a head, the nut or head being used to hold the throttle plates clamped to the body. Throttle plates of the type envisaged are very inexpensive, and hence flow monitors can be delivered with a batch of throttle plates and are thus more universally useable. A sleeve 2c on the other half 2b of the body surrounds the transducer 16. The whole of the transducer or the portion thereof visible in FIG. 6 is capable of being rotated to set the limit pressure at which a warning is given, the pressure setting being effected by means of the elements described with reference to FIG. 5.

The visible, rotatable portion of the transducer has extending peripherally therearound a graduated scale, the values 1.0–3.0 being shown in FIG. 6. The scale can be read off against a triangular mark constituting a stationary indicator arm. A complete or partial ring is rotatably arranged around the sleeve 2c, only the ring portion located beneath a window 33 in the sleeve 2c being shown in the exemplary embodiment. The ring is provided with digits indicating multiplication factors and/or division factors. With the illustrated ring setting in FIG. 6 the number 10 is visible in the window 33 and indicates that the value read off from the scale shall be multiplied by 10, and hence a multiplication sign x is shown on the sleeve 2c between the triangular-shaped indicating mark and the window 33.

It is assumed in the present case that the scale on the transducer 16 extends at most through only one revolution. If the setting is to be effected against a multi-revolutionary scale, the mark x must be replaced with a known linear scale such as that used with conventional micrometers or multi-revolutionary potentiometers for example.

If the digit value of the ring visible in the window 33 is only dependent on the selected, exchangeable throttle plate 24, the throttle plates located innermost in the casing 32 should be marked with the factor by which the ring must be set in the window 33 in order to obtain the correct setting for each throttle plate for which the monitor can be used.

Finally, it should be mentioned that although the embodiment of FIG. 5 illustrates a divided body 2a, 2b, the body may be divided in a plane extending horizontally in FIG. 5, i.e. parallel with the axes of the channel 3 at the transducer 16, this plane extending between the adjacently located points of the sealing ring 25 of the throttle plate and the edge of the diaphragm. The body is thus mounted so that the portion thereof wholly located above the plane can be removed without the two portions 2a, 2b of the body being removed from each other. This enables the flow monitor to be inspected more readily and makes it easier to change a throttle plate. Alternatively, the portion of the flow or differential pressure monitor located above the aforementioned plane can be used without the illustrated throttle plate etc. and optionally also without a device corresponding to that located beneath the dividing plane shown in FIG. 5.

It can also be mentioned that the monitor illustrated in FIG. 5 has the advantage whereby the movable element 9 and its metal portion 13 and the insulating plate 7 are practically never subjected to depositions, particles or the like which is also applicable to all the portions located at or above the passages 27a, 27b since in practice medium does not flow in the passages and above the same and since the lower portions of the annular passages 26a, 26b act as a sump.

What we claim is:

1. A flow and differential pressure monitor for indicating fluid flow comprising a fluid flow channel and a signal generating indicating means, said signal generating indicating means comprising a movable element provided with a metal portion and located within the channel, means mounting said element for movement to different positions by the fluid flowing in said channel, and externally of the channel a transducer in which an oscillator is arranged to be actuated by the metal portion at a certain position of the movable element to switch from one state to another to produce a signal in response to actuation by said metal portion, said switching from one state to another being caused by generation of eddy currents in said metal portion, the channel having a wall portion located between the movable element and the transducer comprising an electric insulating material.

2. A monitor according to claim 1, and means to adjust the metal portion and the transducer to different, predetermined positions in relation to each other.

3. A monitor according to claim 1, characterized in that the movable element has the form of a valve body capable of being moved by the fluid flow against the force of a spring means.

4. A monitor according to claim 3, characterized in that the valve body is movable substantially axially in the channel.

5. A monitor according to claim 4, characterized in that the valve body is movable along a guide mounted in the channel.

6. A monitor according to claim 3, characterized in that the valve body is mounted in a branch channel connected at an angle to the channel, the opposite end of which branch channel is defined by the electric insulating material, and that the valve body is movable substantially fully into the branch channel and is guided thereby.

7. A monitor according to claim 6, characterized in that the metal portion is mounted on a stem displaceably arranged in the valve body and biassed by a spring towards the insulating material.

8. A monitor according to claim 6, characterized in that the channel is provided with a valve seating against which the valve body is caused to abut by means of the spring when no fluid flows in the channel.

9. A monitor according to claim 8, characterized in that the valve body is arranged for movement from the abutment position against the valve seating in a manner such that the area of an exposed through-flow area is changed only negligibly and so that the valve body reaches a position in which a signal is produced.

10. A monitor according to claim 1, characterized in that the movable element is arranged for pivoting movement and that its pivoting axis is located transversely of the channel.

11. A monitor according to claim 1, characterized in that the channel is a side channel, that the movable element is a diaphragm which closes the side channel, that the electric insulating portion has a surface facing the diaphragm, the surface and the diaphragm comprising the two main walls of a chamber, and that any pressure difference between the chamber and a chamber located on the other side of the diaphgram determines the position of the diaphragm at least with a pressure difference exceeding a limit value.

12. A monitor according to claim 11, and means monitoring the transducer for movement to different positions relative to both the metal portion of the diaphgram and the insulating portion, the transducer and the body of the monitor having a scale having associated indicating marks for reading the relative position of the transducer in relation to the diaphragm, said relative position determining the differential pressure at which the monitor produces the aforementioned signal.

13. A monitor according to claim 11, characterized in that the side channel extends with respect to the direction of flow from one side of a throttle plate to the other side of said plate, that the throttle plate is exchangeably arranged in the main channel of the fluid flow, that the monitor body is divided in a plane located perpendicularly to the axis of the main channel and the diaphragm in which plane both the throttle plate and the attachment edge of the diaphragm are located so that the throttle plate with fluid flowing therethrough creates the differential pressure which activates the transducer by means of said metal portion.

* * * * *